United States Patent [19]

Phipps

[11] 4,044,084

[45] Aug. 23, 1977

[54] METHOD OF REMOVING AN ARTICLE FROM A CHAMBER HAVING A REDUCED PRESSURE THEREIN

[76] Inventor: Arthur L. Phipps, 6204 Raymond Court, Erie, Pa. 16505

[21] Appl. No.: 603,715

[22] Filed: Aug. 11, 1975

[51] Int. Cl.² .......................................... B29D 27/00
[52] U.S. Cl. ..................................... 264/51; 264/90; 264/101; 264/178 R; 264/DIG. 13; 425/4 C; 425/71; 425/378 R; 425/DIG. 60
[58] Field of Search ..................... 264/51, 53, 54, 101, 264/199, 101, 178, DIG. 13, 90 R; 425/71, 4 C, 378 R, DIG. 60

[56] References Cited

U.S. PATENT DOCUMENTS

| | | | |
|---|---|---|---|
| 1,619,768 | 3/1927 | Schubert | 264/199 X |
| 1,990,434 | 2/1935 | Kohler | 264/101 X |
| 3,558,753 | 1/1971 | Edlin | 264/54 |
| 3,586,645 | 6/1971 | Granger et al. | 264/51 X |
| 3,704,083 | 11/1972 | Phipps | 425/71 |
| 3,764,642 | 10/1973 | Boutillier | 264/54 X |
| 3,822,331 | 7/1974 | Cogliano | 264/101 X |

FOREIGN PATENT DOCUMENTS

| | | | |
|---|---|---|---|
| 1,084,746 | 9/1967 | United Kingdom | 264/53 |
| 1,233,088 | 5/1971 | United Kingdom | 264/53 |

*Primary Examiner*—Philip Anderson
*Attorney, Agent, or Firm*—Charles L. Lovercheck

[57] ABSTRACT

A method of removing an article from a chamber having a reduced pressure therein by connecting the chamber to a pool of liquid by a barometric leg is disclosed. The method provides a conveyor is said barometric leg and allows said article to float up into engagement with said conveyor so that the force exerted on the article by the conveyor moves the article down into the pool of liquid and out into the atmosphere.

2 Claims, 4 Drawing Figures

METHOD OF REMOVING AN ARTICLE FROM A CHAMBER HAVING A REDUCED PRESSURE THEREIN

This is an improvement of my application Ser. No. 294,770, filed Oct. 4, 1972 which in turn is a division of my application application Ser. No. 47,277, filed June 18, 1970 and now U.S. Pat. No. 3,704,083.

GENERAL STATEMENT OF INVENTION

A need has existed for a method of removing materials from pressures lower than atmospheric pressure on a continuous basis. Earlier teachings show methods of accomplishing this task, but only at the expense of grasping the material, which will henceforth be called a "workpiece", and applying sufficient tensile force on the workpiece to withdraw it from the reduced pressure. Certain of these earlier teachings show the workpiece being withdrawn through a "vacuum seal" such as a rubber diaphragm; others show the workpiece being pulled out of the reduced pressure down through a barometric leg, around a pulley and into the atmosphere. All these earlier teachings have merit for certain applications.

Some workpieces will not tolerate the tensile force necessary to extract the workpiece from reduced pressure. One example of this kind of workpiece is thermoplastic foam; freshly extruded polystyrene foam at or below densities of about 1.5 pounds per cubic foot (PCF) is very soft and fragile such that it is adversely affected when withdrawn from reduced pressure by virtue of its own tensile strength.

This invention teaches a method of extracting a workpiece from reduced pressures through a liquid seal providing only that the work piece is lighter than the liquid such that the workpiece is buoyed up, or floats, when immersed in the liquid.

This unique, and novel method applies no tensile forces on the workpiece so that the most fragile workpiece may be recovered through the practice of this invention.

The basic principle of the invention is simply that the workpiece is gently submerged in the liquid as the workpiece leaves the domain of reduced pressure and is submerged further and further until, finally, at some depth in the liquid the pressure being experienced by the workpiece is equal to atmospheric pressure whereupon the workpiece is released into the atmosphere.

Everyone is familiar with the fact that water will be "sucked up" into a pipe if the lower end is placed in water and the upper end is evacuated of air; the more air which is evacuated, the higher the water will rise until finally, at a height of 34 feet the water stops rising. Essentially all air has been exhausted above the water in the pipe at this point. The height of water, 34 feet, corresponds to the pressure of the atmosphere since it is atmospheric pressure pushing water up the pipe which causes the water level to rise.

When the experiment just described is performed with liquid mercury, the highest level will be only about 30 inches rather than 34 feet. This is because mercury is much denser than water. A reduced pressure equal to one inch of mercury is also equal to about 1.13 feet of water, two inches of mercury to 2.26 feet of water and so forth.

All the heights mentioned in the preceeding two paragraphs are vertical heights. The vertical height will be the same for the same degree of reduced pressure whether the pipe is vertical or is inclined or is bent or is a big pipe or a little one or is a combination of big and little pipes.

The term "barometric leg" is oftentimes used to indicate a pipe containing a liquid above which some degree of reduced pressure is maintained; this convenient terminology will be hereinafter employed.

GENERAL DESCRIPTION OF DRAWING

DETAILED DESCRIPTION OF DRAWINGS

Figure 1:
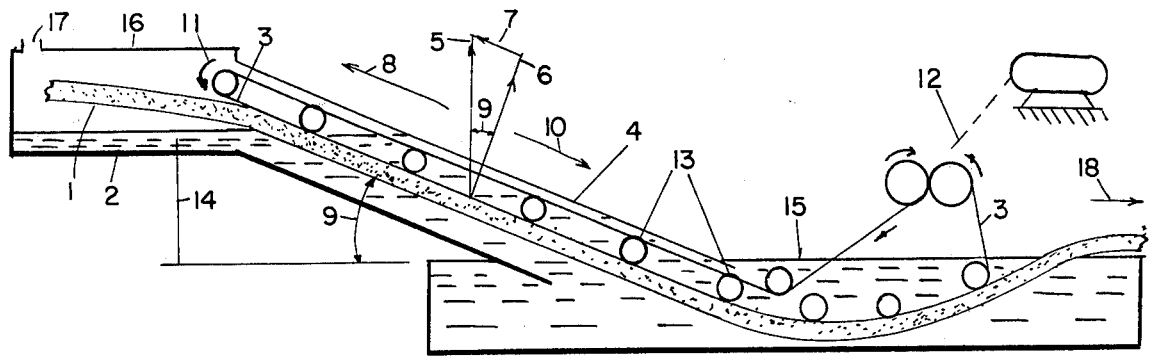
FIG. 1 is a diagramatic view of the apparatus for carrying out the method according to the invention.

Now with more particular reference to the drawings, one embodiment illustrating the use of the method is seen in FIG. 1. The workpiece 1 tries to float in the liquid 2. In so doing, the workpiece 1 contacts the surface of a conveyor belt 3 which is located within the barometric leg 4. The workpiece 1 exerts an upward force 5 which may be visualized in two components, force 6 and force 7. Component force 6 is perpendicular to the surface of the conveyor belt 3 thereby increasing the friction between belt and workpiece. Component force 7 tries to cause the workpiece to escape in direction 8. The smaller angle 9 becomes, the smaller force 7 becomes, and the larger force 6 becomes. Thus, for some value of angle 9 — and for all lesser angles — the tendency of the workpiece 1 to move via force 7 is overcome by the friction and the workpiece is conveyed downward in direction 10.

Angle 9 may be estimated by determining the coefficient of friction between workpiece 1 and conveyor belt 3 while both are wetted or immersed in the liquid 2; the coefficient of friction will be the tangent of angle 9. Selection of a lesser angle than that calculated would provide a certain amount of assurance of performance.

It is apparent in referring to FIG. 1 that the conveyor belt 3 is being driven in direction 11 by means of a conventional conveyor belt drive system 12, preferably a variable speed electric motor with appropriate transmission. The conveyor belt 3 must be supported with suitable means within the barometric leg 4. A preferred mode is to place idler rollers 13 at intervals along the length of the belt.

The height 14 of the liquid above the surface of the pond 15 will be determined by the amount of reduced pressure within the vacuum chamber 16. The reduced pressure is achieved through conventional controls and vacuum pump connected through a suitable orifice 17 to the vacuum chamber 16.

In practice, the workpiece 1 will move from the vacuum chamber 16 thence will be submerged in the liquid 2 by virtue of being submerged by action of the conveyor belt 3 thence travel along with the belt on its journey downwards through the barometric leg 4 thence into the pond 15 thence following the belt upward out of the pond and leaving the system in direction 18.

Figure 2:
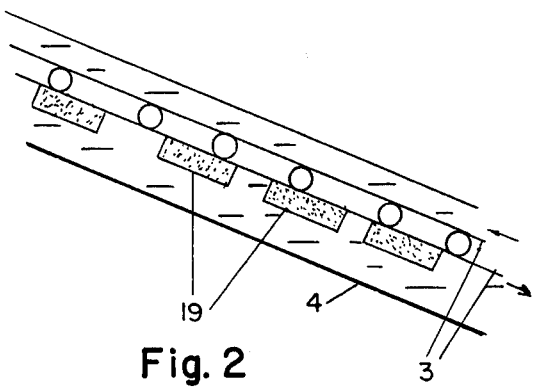
FIG. 2 is a partial view of the barometric leg shown in FIG. 1 showing individual parts moved along by the conveyor.

Friction between belt 3 and workpiece 1 is the only impetus which takes the workpiece along with the belt through the liquid 2. Continuity of the workpiece is not required since one section of the piece has no effect on the other sections. There are no tensile forces pulling on the workpiece. This may be appreciated in FIG. 2 where it is apparent that each section 19 will move along quite independently of the others.

The origin of the workpiece 1 was not shown in FIG. 1, since the workpiece may be introduced into the vacuum chamber 16 in diverse ways. One origin will be illustrated in the examples.

Figure 3:
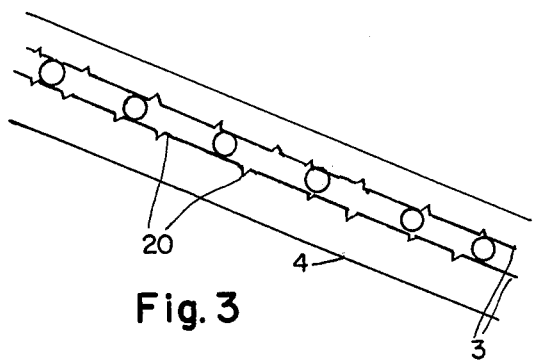
FIG. 3 is a view of another embodiment of the invention showing protuberances on the conveyor to increase the force of the conveyor on the articles.

Friction alone may be less persuasive than some users of these teachings would prefer. In referring to FIG. 3, it is obvious that pins, prongs, spikes, blades, 20, or other protuberances may be affixed to the conveyor belt in order to secure a more firm grasp between belt and workpiece.

Figure 4:
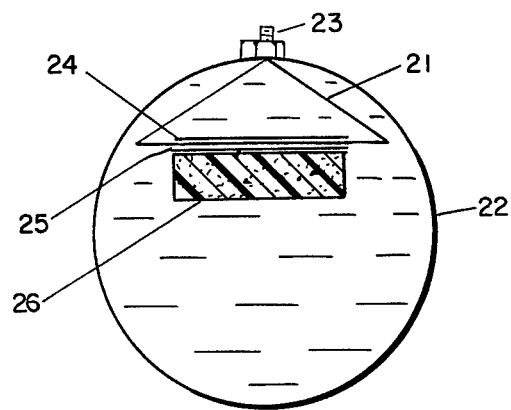
FIG. 4 is a cross sectional view of the barometric leg in a pilot plant wherein a conveyor is used in the barometric leg.

Example 1. A pilot plant was constructed. The barometric leg 4 was a length of aluminum tubing, 6 inches diameter by 136 feet long. The conveyor belt supported was fabricated as shown in FIG. 4 because there was not room within the leg for the preferred idler rollers. Idler rollers were used for belt support beyond the extremes of the leg. In referring to FIG. 4, the support 21 was sheet aluminum bent into a triangular shaped channel, inserted into the 6 inch diameter leg 22, and fastened in place with bolts 23 at intervals along the length of the leg. FIG. 4, which is a cross section, shows the conveyor belt 24 on its travel toward the vacuum chamber and also the belt 25 on its travel toward the pond with a cross section of the workpiece 26 floating against the belt and being conveyed toward the pond. The pilot plant leg was inclined from the horizontal at an angle of 14°28'. The conveyor belt was woven polypropylene, 4 inches wide, driven by a horsepower, variable speed motor through a suitable gear reducer. A plastic extrusion die was placed inside the vacuum chamber with the feed channel, or adaptor, for the die passing through the end of the vacuum chamber opposite the end where the barometric leg was fastened. Any material, or workpiece, which would issue from the die would then travel the length of the vacuum chamber thence encounter the conveyor belt and thence begin the journey through the leg. A small conventional extruder was affixed to the die adaptor and commercially available expandable polystyrene pellets were fed to the extruder hopper. The foam which issued from the die was found to be 3.3 pounds per cubic foot (PCF) when extruded into the atmosphere. The density was lowered to 1.8 PCF when the chamber was partially evacuated of air, and the foam was recovered continuously via the method of being submerged down through the barometric leg as heretofore described.

In Example II, the liquid used for nearly all work in the pilot plant, which was described in Example I, was ordinary water. A test was designed to illustrate that other liquids would perform in the same way. A solution was made consisting of 57% sucrose and 43% water. The specific gravity of the solution was 1.27; this is 27% heavier than ordinary water. Expandable pellets were fed to the extruder. The density of the polystyrene foam was 5.4 PCF when extruded into the atmosphere. The density was lowered to 2.5 PCF when the foam was extruded into a vacuum corresponding to 19 inches mercury vacuum; the identical result was obtained when the liquid was ordinary water and when the liquid was the heavy solution of sucrose.

In Example III, another thermoplastic was selected to illustrate that various plastic foams would be lowered in density through the practice of the invention. Commercially available expandable polystyrene pellets were used in Examples I and II. Commercially available branched chain polyethylene pellets were mixed with a powered chemical blowing agent of which there are many on the market. This mixture was fed into the extruder hopper. The foam issuing from the die was 41.0 PCF when extruded into the atmosphere. The density of this polyethylene foam was lowered to 12.3 PCF when extruded into a vacuum corresponding to 27 inches of mercury vacuum and was recovered by being submerged through the barometric leg as described in Example I.

Examples I, II, and III used feedstocks for the extruder in which the blowing agent was incorporated within the feed, either impregnated in the plastic or admixed with the plastic. Another series of tests was selected to illustrate another mode of adding the blowing agent. Commercially available polystyrene pellets were fed to the extruder hopper and a liquid blowing agent was injected into the extruder barrel in a manner well known and practiced commercially. In every combination of polystyrene and liquid blowing agent, the density which was recovered via vacuum using the pilot plant described in Example I was considerably less than those densities obtained at ordinary atmospheric extrusion. Densities at a nominal 1.0 PCF were obtained many times, this is lower than any practical polystyrene densities heretofore extruded.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In a method of producing a low density foamed thermoplastic resin article by extruding a foamable thermoplastic resin into a chamber at subatmospheric pressure and withdrawing the foamed thermoplastic resin extrudate from said chamber into the atmosphere, the improvement comprising, providing a vacuum chamber with means to evacuate it, a barometric leg connected to said vacuum chamber and terminating in a pool of liquid open to the atmosphere, the density of the liquid being greater than the density of said foamed thermoplastic resin extrudate and the barometric leg having a conveyor therein extending from the vacuum chamber into said pool of liquid, conveying said extrudate from said chamber without substantial tension sufficient to deform said extrudate into said pool of liquid whereby said workpiece floats up into engagement with said conveyor and moving said extrudate with said conveyor into said pool of liquid and through said liquid out into said atmosphere, said conveyor having a relatively flat underside inclined at an acute angle to the horizontal such that friction between the workpiece and the conveyor is sufficient to cause said extrudate to move along with the conveyor through said pool of liquid.

2. The method recited in claim 1 wherein said conveyor has protuberances on the lower side thereof and said protuberances grasp said extrudate, thereby moving said extrudate along with said conveyor through said pool of liquid until said extrudate is released into said atmosphere.

* * * * *